(12) United States Patent
Morgan

(10) Patent No.: US 7,289,090 B2
(45) Date of Patent: Oct. 30, 2007

(54) PULSED LED SCAN-RING ARRAY FOR BOOSTING DISPLAY SYSTEM LUMENS

(75) Inventor: Daniel J. Morgan, Daynton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 698 days.

(21) Appl. No.: 10/732,090

(22) Filed: Dec. 10, 2003

(65) Prior Publication Data

US 2005/0128441 A1   Jun. 16, 2005

(51) Int. Cl.
*G09G 3/32* (2006.01)

(52) U.S. Cl. .......................................... 345/82; 345/32

(58) Field of Classification Search ................. 345/82, 345/697, 211, 212, 213, 214, 31–39, 84, 30; 348/742, 602, 801; 353/85, 94; 362/309; 382/309
See application file for complete search history.

(56) References Cited

U.S. PATENT DOCUMENTS

| | | | |
|---|---|---|---|
| 5,061,049 A | 10/1991 | Hornbeck | |
| 5,280,277 A | 1/1994 | Hornbeck | |
| 5,940,683 A | 8/1999 | Holm et al. | |
| 6,324,006 B1 | 11/2001 | Morgan | |
| 6,441,943 B1 | 8/2002 | Roberts et al. | |
| 2004/0008288 A1* | 1/2004 | Pate et al. | 348/742 |
| 2004/0120153 A1* | 6/2004 | Pate | 362/296 |
| 2005/0117347 A1* | 6/2005 | Melpignano et al. | 362/309 |
| 2006/0170883 A1* | 8/2006 | Matsui | 353/85 |

\* cited by examiner

*Primary Examiner*—Nitin I. Patel
(74) *Attorney, Agent, or Firm*—Wade James Brady, III; Frederick J. Telecky, Jr.

(57) ABSTRACT

A display apparatus 200 includes a substrate 219 and a number of light emitting diodes (LEDs) 202 coupled to the substrate. An optical element 207 such as a shroud or an integrator rod is located adjacent to at least one of the LEDs. In operation, the optical element and the LEDs are movable relative to one another so that the optical element is adjacent to different ones of the LEDs at different times.

69 Claims, 9 Drawing Sheets

PULSED LED SCAN-RING ARRAY FOR BOOSTING DISPLAY SYSTEM LUMENS

TECHNICAL FIELD

The present invention relates generally to display systems and the preferred embodiment relates to a pulsed LED scan-ring array for boosting display system lumens.

BACKGROUND

One technology that is used for display systems is based on a digital micromirror device or DMD. Such systems are commercially available from Texas Instruments, Inc. under the trademark DLP™ (Digital Light Processing). Referring to FIG. 1, an example of a DMD system 10 is illustrated, wherein the light from a light source 11 is applied through a first condenser lens 13 and through a color wheel 15, which will typically rotate at least once per frame of the image to be displayed. The light passing through the color wheel 15 passes through a second condenser lens 17 onto a DMD chip 19. The DMD chip includes an array (on the order of one million) of tiny mirror elements, or micromirrors, where each mirror element is hinged by a torsion hinge and support post above a memory cell of a CMOS static RAM as shown in FIG. 2.

FIG. 2 shows a portion of a typical DMD array 19 having mirror elements 21 suspended over a substrate 23. Electrostatic attraction between the mirror 21 and an address electrode 25 causes the mirror to twist or pivot, in either of two directions, about an axis formed by a pair of torsion beam hinges 27a and 27b. Typically, the mirror rotates about these hinges until the rotation is mechanically stopped. The movable micromirror tilts into the on or off states by electrostatic forces depending on the data written to the cell. The tilt of the mirror is on the order of plus 10 degrees (on) or minus 10 degrees (off) to modulate the light that is incident on the surface. For additional details, see U.S. Pat. No. 5,061,049 entitled "Spatial Light Modulator" and U.S. Pat. No. 5,280,277 entitled "Field Updated Deformable Mirror Device," both by Larry J. Hornbeck.

Referring again to FIG. 1, the light reflected from any of the mirrors may pass through a projection lens 29 and create images on the screen 31. The DMD's are controlled by electronic circuitry fabricated on the silicon substrate 23 under the DMD array. The circuitry includes an array of memory cells, typically one memory cell for each DMD element, connected to the address electrodes 25. The output of a memory cell is connected to one of the two address electrodes and the inverted output of a memory cell is connected to the other address electrode.

Data is provided by a timing and control circuit 33 determined from signal processing circuitry and an image source indicated at 35. Once data is written to each memory cell in the array, a voltage is applied to the DMD mirrors 21 creating a large enough voltage differential between the mirrors 21 and the address electrodes 25 to cause the mirror to rotate or tilt in the direction of the greatest voltage potential. Since the electrostatic attraction grows stronger as the mirror is rotated near an address electrode, the memory cell contents may be changed without altering the position of the mirrors once the mirrors are fully rotated. Thus, the memory cells may be loaded with new data while the array is displaying previous data.

The intensity of each color displayed on the screen 31 is determined by the amount of time the mirror 21 corresponding a particular pixel directs light toward screen 31. For example, each pixel may have 256 intensity levels for each color (e.g., red, green or blue). If the color level selected for a particular pixel at a particular time is 128, then the corresponding mirror would direct light toward that area of screen 31 for ½ (e.g., $128/256$) of the frame time.

SUMMARY OF THE INVENTION

In one aspect, the present invention provides a pulsed LED scan-ring array for boosting display system lumens. In this embodiment, the light source is made up of a number of LEDs that are pulsed so that they can output greater amounts of light. This pulsing can be accomplished by utilizing a number of LEDs for each color so that the total amount of time that each LED is turned on over a frame time is reduced.

In a first embodiment, a display apparatus includes a number of LEDs mounted along a periphery of a ceramic substrate used as a printed circuit board. A motor is located in substantial alignment with a center point of the ceramic board. A light collection shroud assembly is coupled to the motor. The shroud assembly has an input window that can rotate over the periphery of the ceramic board.

This apparatus can be used in a display system. For example, the shroud assembly and the plurality of LEDs can be made movable relative to each other so that the shroud assembly is adjacent to different ones of the LEDs at different times. In the preferred embodiment, the LEDs are fixed and the shroud assembly rotates. A stationary integrator rod is located to receive light from the shroud assembly. The LEDs lit at any given time on the ceramic board form a rectangle with an aspect ratio compatible with a spatial light modulator (e.g., a digital micromirror device) as well as the input to the stationary integrator rod. The spatial light modulator is located to receive light from a relay lens and provide modulated light to a projection lens.

Aspects of the invention include a number of advantages over prior art display systems. For example, LEDs have a longer life than arc lamps and therefore do not need to be replaced as often. In addition, the ring array techniques allow LEDs to have a much greater light output in lumens. This fact greatly enhances the commercial viability of using LEDs in applications such as business projectors and digital televisions. Other advantages are described in the detailed description that follows.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Commercially available DMD-based projectors typically use an arc lamp as the illumination light source. A single DMD is commonly used with the illumination light applied in a color sequential manner (called Field-Sequential-Color or FSC). A rotating color wheel is typically used to apply the light from the lamp to the DMD. Light is applied as R (red) then G (green) then B (blue) with each color sequentially applied so that the color completely fills the DMD. With this system there are time intervals during each frame where the colors are briefly a mix of some pair of the RGB primary colors. This occurs when the spokes of the color wheel are passing through the lamp output light cone. This spoke light is used in today's projector via Spoke-Light-Recapture (SLR). So, for an all white screen, today's FSC projectors have the DMD on throughout the R, G, and B segment times as well as during all of the spoke times.

However, when a single color is applied to the DMD in an FSC system, the complement colors are reflected by the color wheel and this light is scattered and lost. The color wheel is only transmissive for the color currently being applied to the DMD. For an all white screen, approximately ⅔ of the screen lumens are lost since only one of three colors of the visible spectrum of lamp light is transmitted through the color wheel to the DMD.

Figure 1:
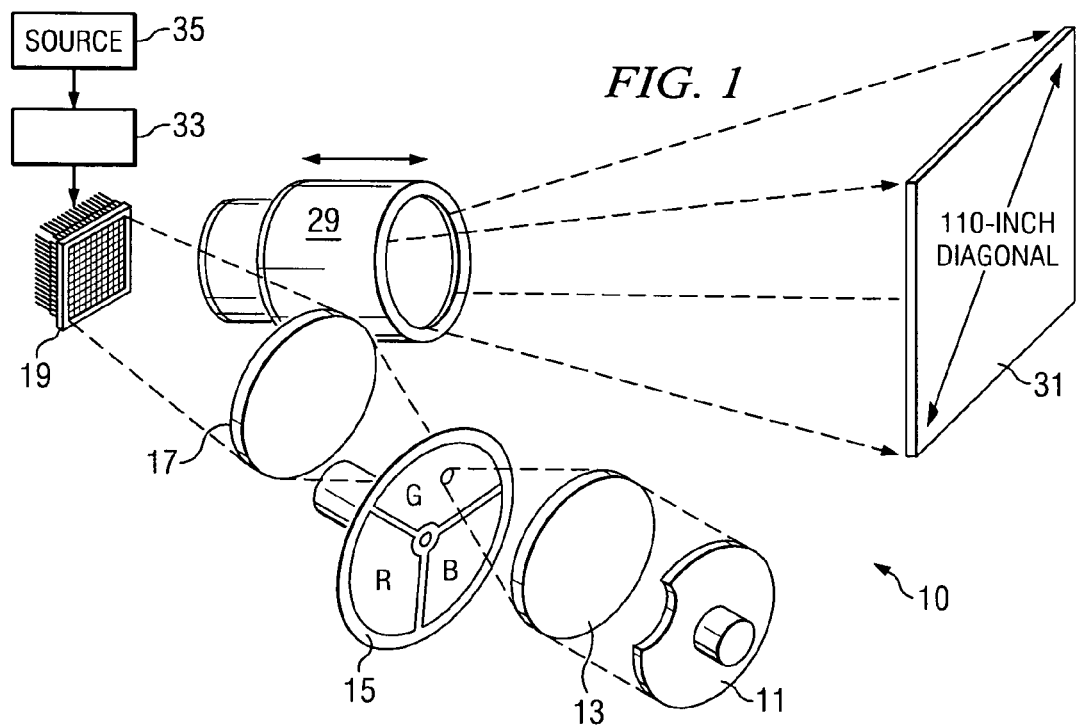
FIG. 1 is a block diagram of a conventional DMD-based display system.
Figure 2:
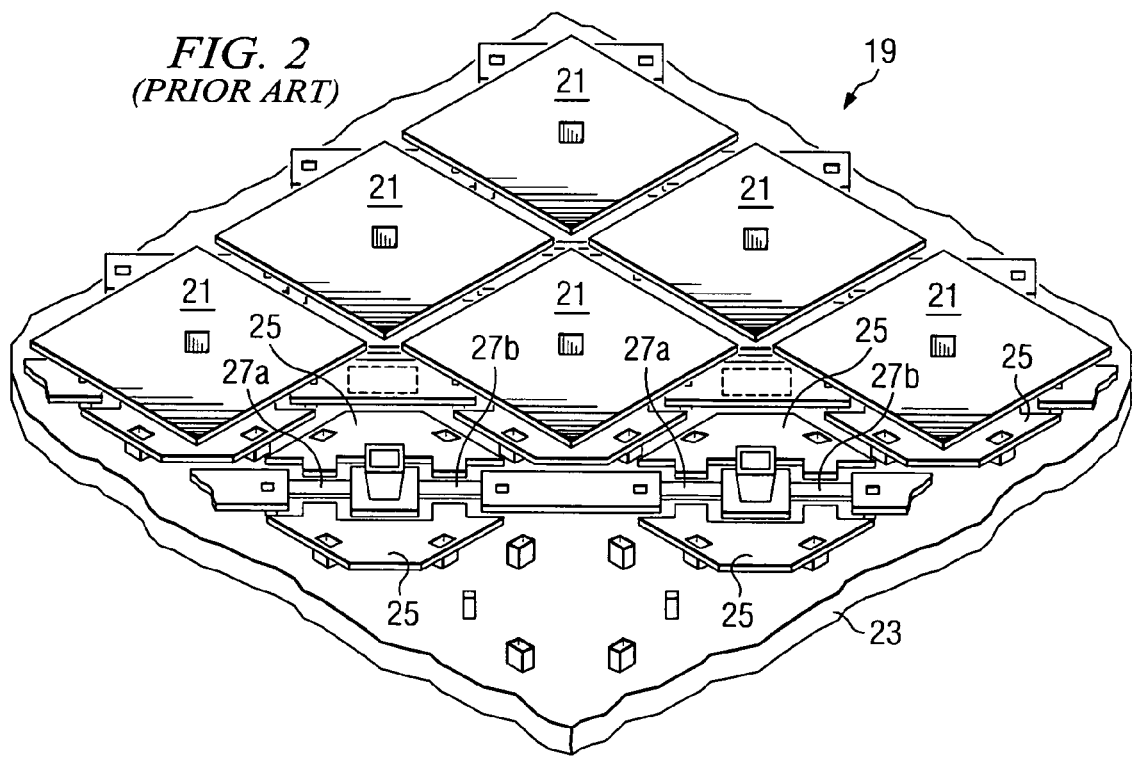
FIG. 2 is a view of an array of DMD mirrors.
Figure 3:
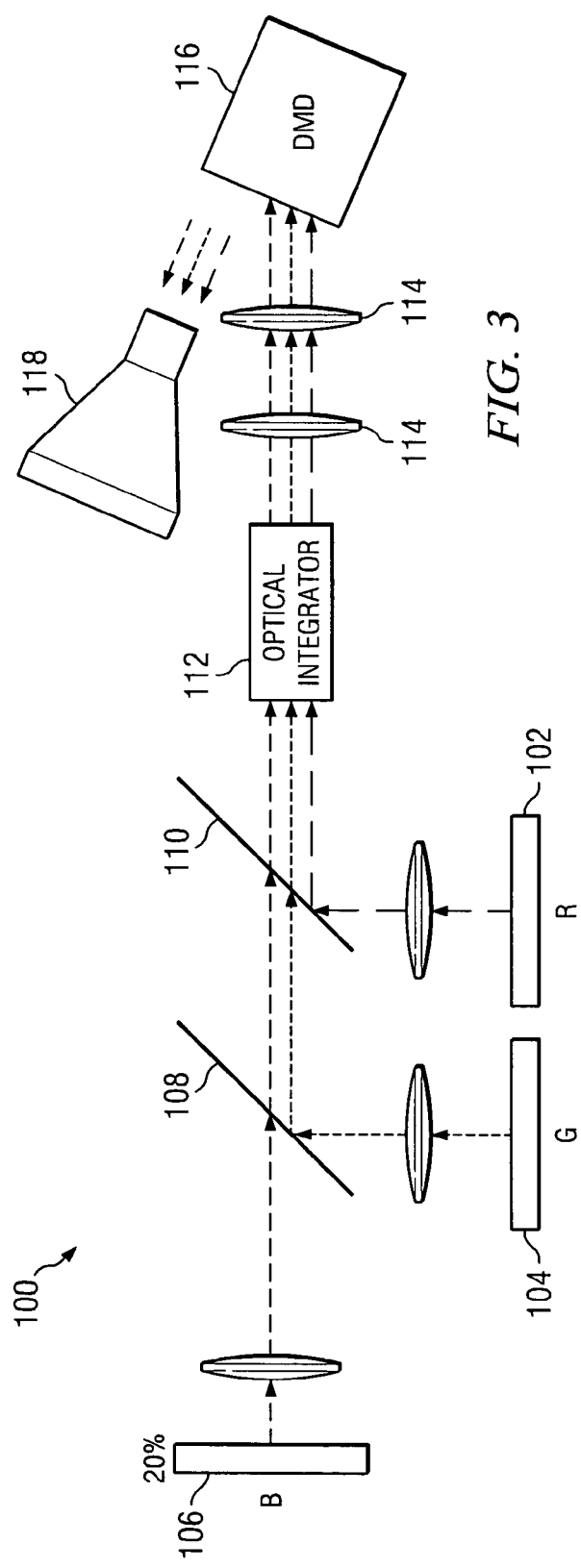
FIG. 3 is a block diagram of a fixed array LED system.

Using three arrays of LEDs is also an option for illuminating the DMD as shown in FIG. 3. In this patent an LED array system 300 as shown in FIG. 3 is referred to as a "Fixed Array" or FA. An LED Fixed Array system has three stationary red, green, and blue arrays 102, 104 and 106. No moving parts are used. The light is applied sequentially by turning on the red array 102, then the green array 104, and then the blue array 106. One advantage of using LED arrays rather than an arc lamp in a projector is that when one LED array is on the other two are off. So when one LED FA is on nearly all of the light collected by the optics for illuminating the DMD is within the usable spectrum that the optics will pass to the DMD.

In operation, light from blue LED 106 is transmitted through filter 108 and filter 110 to optical integrator 112. Likewise, light from green LED 104 is reflected from filter 108 but transmitted through filter 110 to optical integrator 112. Light from red LED 102 is reflected from filter 110 to optical integrator 112. Light from optical integrator 112 is transmitted to relay lens group 114 from where it is directed to DMD array 116. Light from DMD array 116 is directed to projection lens 118 from where it can be displayed on a screen or other display medium (not shown).

With an LED Fixed Array, however, a small amount of overlap occurs in the distribution of emitted light spectrum between, for example, the green and blue LEDs. In the optics arrangement of FIG. 3, the color filters cannot pass the overlapping colors for both the green and blue LED arrays. The "tail" of the spectrum for both green and blue is rejected by the color filters 108 and 110. But this rejection of light by the optics is not as pronounced as in a color wheel based projector using an arc lamp. So in general, an LED Fixed Array based projector is less wasteful in terms of rejecting illumination source light because of its spectrum.

The LED Fixed Arrays in FIG. 3 are assumed to be turned on with the green array 104 on for 62% of the time, the red array 102 on for 18% of the time, and the blue array 106 on for 20% of the time. The green array is turned on for the longest amount of time because green LED technology has lagged behind red and blue LEDs when LED technology is applied to illumination in projectors. Since typically approximately 70% of the lumens on a full white screen are from the color green, this means that much more brightness is needed from green LEDs when compared to red and blue LEDs. However, since green LEDs are not much brighter in terms of lumens/Watt output than red LEDs, the green LED Fixed Array must be pulsed for 3.4 (62%/18%) times longer in time each frame to achieve the appropriate G lumens to get the proper color coordinate for white.

A summary of some of the advantages of using LEDs in a projector instead of arc lamps is provided below. These advantages can apply to the FA concept shown in FIG. 3 as well as to various ones of the embodiments that will be described below.

Little of the light source lumens are rejected because of its spectrum.

10,000-100,000 hour lifetime. Never need to replace lamp over life of projector.

Saves end-user cost and hassle of replacement lamps.

Well suited for ordinary consumer who expects no maintenance on a television.

No lamp module parts and no lamp door parts.

Very saturated colors.

Brighter yellow since there is no white segment on the color wheel that makes yellow in an image dimmer relative to white in an image.

No color wheel.

No high voltage ignitor, ballast, or interlock switch.

DC power supply only. Many low-cost sources exist for DC power supplies.

No UV or IR filters needed.

Will eventually enable smaller projectors and higher lumens/Watt on the screen. The higher lumens/Watt means that the power supply can be smaller and the cooling fans smaller. Since the lamp module, lamp door, color wheel, ballast, ignitor, and interlock switch are also not needed, this also helps reduce projector size. Also a lamp reflector is not needed.

Can reduce LED power real-time to achieve shorter effective on-times for LSB bits. This feature allows more "real" bit depth on the DMD instead of achieving more bit depth with dithering.

However, LED technology has lagged far behind arc lamp technology in being able to achieve comparable screen lumens. LED arrays can be used in a projector but not enough LEDs can fit into the limited etendu (light collection capacity) of the DMD so that acceptable screen lumens can be achieved in the marketplace. Power to each LED in any array can be increased but limitations are reached in allowable LED junction temperatures.

Tables 1-4 show analyses based on the FA concept in FIG. 3 where 40 LEDs are in each of the R, G, and B Fixed Arrays. In this example the LED arrays are configured with an array of bare die on a ceramic substrate with a metal backing. The DMD projection optics are assumed to be f/2.4, which is as fast as they can typically be run for a DMD with a ±12.5 deg tilt angle. f/2.4 sets the usable etendu, or light collection capacity, of the DMD for the LED application shown in FIG. 3.

The analyses in Tables 1-4 assume that each LED in the array gives 45 lumens/Watt for the red, 90 lumens/Watt for green LEDs, and 21 lumens/Watt for the blue LEDs. These are LED efficiency numbers assuming the typical spec sheet recommended operation condition with the nominal recommended DC current operation (no pulsing of LEDs). With pulsing, as used in FIG. 3, it is assumed that the LED efficiency drops for all LEDs in the Fixed Arrays. This is one

TABLE 1

LED Assumptions:

+/− 45 deg light cone collected from each LED by system optics to collect 80% of LED output
.60 mm LED die pitch
99% area "fill factor" of hexagonal lens in microlens array above LED dies DMD Assumptions:

+/− 12.5 deg light cone accepted by DMD (f/2.4)
.7" diagonal DMD (14.0 mm × 10.5 mm)
1.18 × "area overfill" of DMD needed by optics

| Single LED Lens Cell Etendu Calculations: | DMD Etendu Calculations: |
|---|---|
| Area = .60$^2$ = .36 mm$^2$ | Area = 14.0 × 10.5 = 147.24 mm$^2$ |
| Angle = 6.28 × (1 − COS(45 deg) = 1.8394 sr | Angle = 6.28 × (1 − COS(12.5 deg) = .1489 sr |
| Etendu = .36 × 1.8394 = .6622 mm$^2$ * sr | Etendu = 147.24 × .1489 = 21.92 mm$^2$ * sr | of LEDs that fit into LED array = (21.92/.6622) × 1.18 × .99 = 38.7 LEDs (~39 LEDs)

Table 1 calculates the etendu of the DMD for f/2.4. Also calculated is the etendu of each LED microlens cell in array. By dividing the DMD etendu by the LED etendu the number of LEDs allowed in each fixed array can be derived. The light cone from each LED is assumed to have a collectable viewing angle of ±45 degrees. At ±45 degrees it is assumed that 80% of the light emitted from the LED package is collected by the optics as indicated in Table 3.

Table 1 uses this viewing angle to compute the etendu of each LED. The etendu of each LED array must also be scaled down by the "fill factor" of the array since the LED microlens cannot be packed with zero wasted area between them. However, a fill factor of 99% is used in Table 1 since the microlens arrays can be precision molded as a solid plastic unit. While the fill factor reduces the number of LEDs possible in the Fixed Array, the DMD light overfill required increases the number of LEDs allowed because the effective area of DMD illumination is increased. From Table 1 it can be seen that 39 LEDs can fit into each of the R, G, and B fixed arrays.

of the losses shown in Table 3 and is contained with the "LED Losses" factor in Table 2.

TABLE 3

| | |
|---|---|
| .430 | Efficiency loss due to using pulsed current (compared to DC current) for G and B |
| .860 | Efficiency loss due to using pulsed current (compared to DC current) for R |
| .950 | LED spectrums overlap - so must reject tails |
| .800 | LED light outside of used light cone (collect only +/− 45° of total LED light) |
| | .430 × .800 × .95 = .327 net LED Losses for G and B |
| | .860 × .800 × .95 = .654 net LED Losses for R |

Also shown in Table 3 is an LED loss due to the overlap of LED spectrums which results in rejected light as described earlier and shown in FIG. 3. A factor of 0.95 is assumed for each fixed array for this loss.

Table 2 derives the average screen lumens achieved for a single LED of each color. Table 4 shows that when each of

TABLE 2

| Single LED output (DC, unpulsed) | | .56 W during pulse, .334 W G average | | LED losses | | System optics losses | | Lumens when pulsed | |
|---|---|---|---|---|---|---|---|---|---|
| 45 L/W | × | (.13 A × 4.31 V) | × | .654 | × | .42 | = | 6.92 | Red |
| 90 L/W | × | (.08 A × 7.00 V) | × | .327 | × | .49 | = | 8.08 | Green |
| 21 L/W | × | (.08 A × 7.00 V) | × | .327 | × | .42 | = | 1.62 | Blue |

| % on-time for LEDs | | Lumens when pulsed | | | |
|---|---|---|---|---|---|
| .14 | × | 6.92 L | = | 0.97 R Lumens average for one R LED |
| .60 | × | 8.08 L | = | 4.85 G Lumens average for one G LED |
| .26 | × | 1.62 L | = | 0.42 B Lumens average for one B LED | the LED lumens is multiplied by 39 to account for the 39 LEDs in each Fixed Array, only 243 screen lumens are achieved for the LED FA based projector. Thus, a method is needed to maintain 20,000 lifetime while boosting screen lumens when using LEDs.

TABLE 4

| | |
|---|---|
| R LEDs pulsed on at once × Avg. Lumens of a Single R LED | (39 LEDs × 0.97 L) |
| G LEDs pulsed on at once × Avg. Lumens of a Single G LED | (39 LEDs × 4.85 L) |
| B LEDs pulsed on at once × Avg. Lumens of a Single B LED | (39 LEDs × 0.42 L) |
| Total Screen Lumens | 243 |

It is known in the LED industry that the brightness fades more rapidly over the life of the LED if more power and/or higher junction temperatures are used. However, this is usually in regard to considering how an LED fades in brightness over 100 k hours. An LED could fade to 50% brightness in just 20 k hours and this would still be acceptable for a conference room projector since at 50% brightness the projector would normally be replaced with a newer model.

The preferred embodiment provides a system that achieves this increased boost in screen lumens, while not degrading LED life, by using a concept called a Pulsed LED Scan-Ring Array. For short this embodiment is called the "Ring Array" and abbreviated "RA" in this specification. In this disclosure the standard LED array method shown in FIG. 3 is called the "Fixed Array" method abbreviated as "FA". Even if LED efficiencies are someday much higher (say 300 lumens/Watt) the RA approach still provides a significant lumens boost over the FA approach.

The preferred embodiment of this invention provides a method to enable pulsing LEDs with higher currents to increase their brightness. Since pulsing of the LEDs also increases their power during the pulse, the LEDs are turned on with a very low duty cycle. In the FA LED illumination method, the green LEDs are pulsed with a duty cycle of 62%, R with 18%, and B with 20%. With the LED Ring Array method, in the example that follows, the duty cycle for all LEDs is only about 13%. This allows the current to be pulsed higher when each LED is on yet the average power is reduced for each LED.

Figure 4:
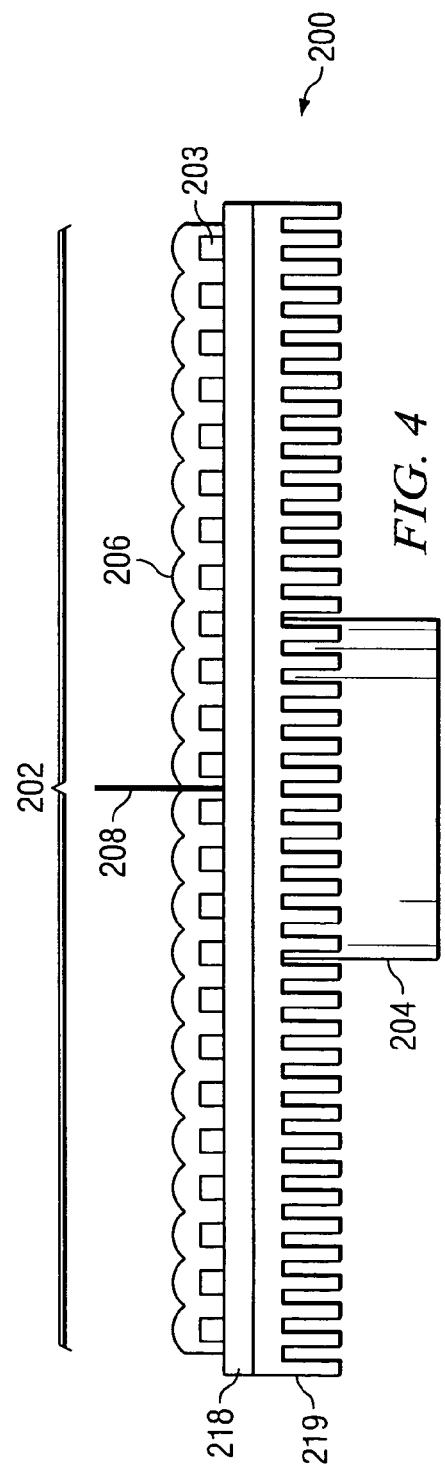
FIG. 4 provides a first view of an LED ring array apparatus of the present invention.
Figure 5A:
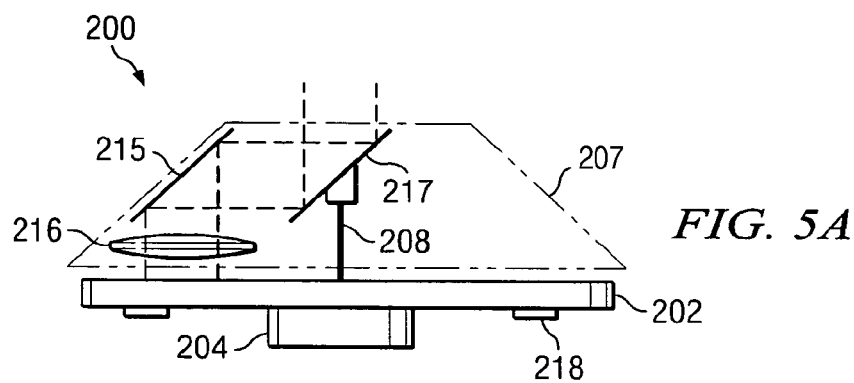
FIGS. 5a and 5b provide second and third views of an LED ring array apparatus of the present invention.
Figure 5B:
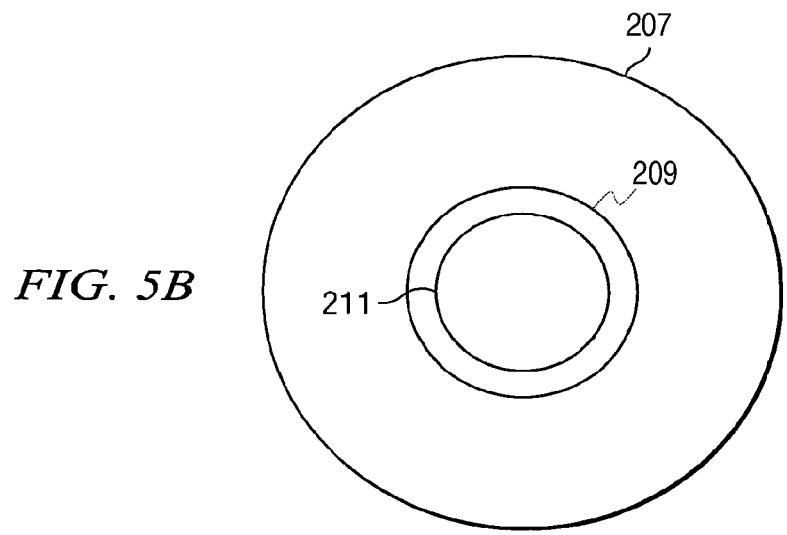
Figure 7:
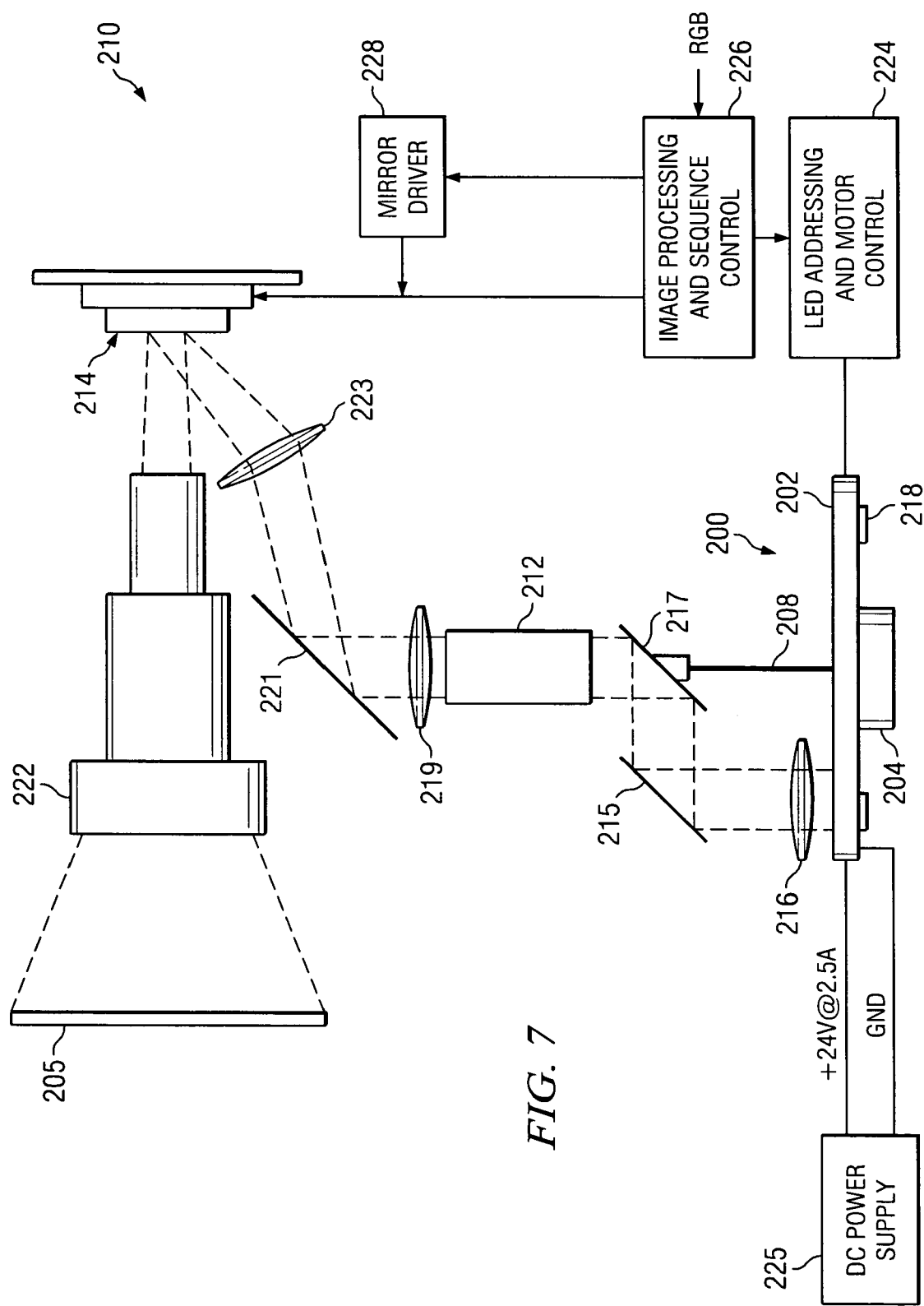
FIG. 7 shows a block diagram of a system that uses the LED ring array apparatus of FIGS. 4, 5a, 5b and 6.

FIGS. 4, 5 (which includes FIGS. 5a and 5b) and 6 show side and plan views of an LED Ring Array apparatus 200 and FIG. 7 shows a system 210 that utilizes the Ring Array. A ring 202 of LEDs 203 is formed that includes a number of LEDs of each color, e.g., red, green and blue (and thus portions of the ring 202 are labeled 202R, 202G and 202B). In other embodiments, complementary colors can be used. In the preferred embodiment, the percentage of each color used corresponds to the on-time percentages needed in each color to get proper color balance for white on the screen. In this example, the total number of LEDs 203 in the ring 202 is divided up as 14% red, 60% green and 26% blue. These LEDs 203 are located in the red portion 202R, the green portion 202G and the blue portion 202B of the ring 202. In the preferred embodiment, the LED Ring Array 202 has an outer dimension of about 30×35 mm and an inner dimension of about 20 mm.

Figure 6:
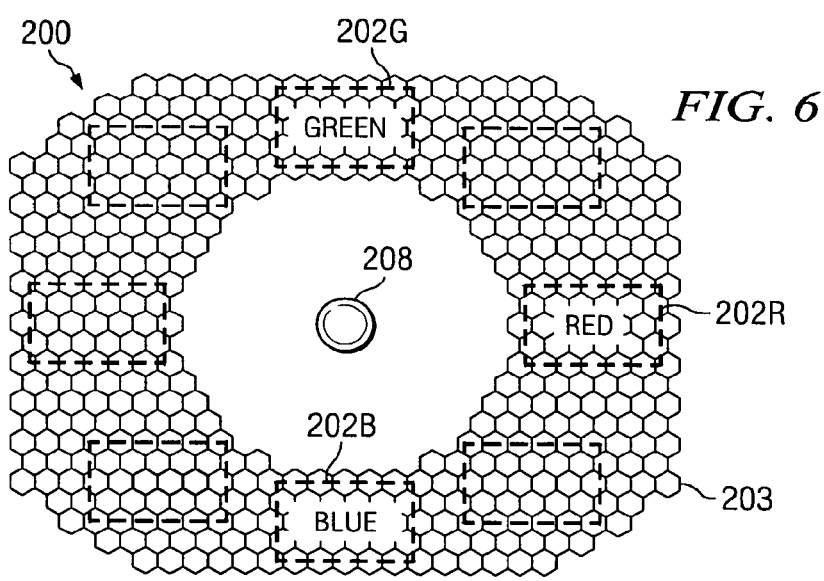
FIG. 6 provides another view of an LED ring array apparatus of the present invention.

In the preferred embodiment, the LEDs 203 are bare dies mounted on a substrate 218 that comprises a ceramic printed circuit board. For example, a ceramic substrate with a metal backing is available from Lamina Ceramics. A clear encapsulation material overlies the LEDs 203 and is formed into a microlens array 206. In the preferred embodiment, each microlens is hexagonal shaped, as shown in FIG. 6. In this embodiment, one microlens 206 overlies each LED die 203. The substrate 218 is used in conjunction with a heat sink 219, which preferably includes metal fins. For example, each of the individual LEDs can be mounted onto the PCB 218 and electrically connected to the control and power electronics that turn the LEDs on and off.

A motor 204 is mounted on a motor shaft 208 as shown in FIGS. 4 and 5a and 5b. The motor 204 preferably rotates at about 120 Hz, although other rotation speeds are allowed. Light from the LED array 202 is collected by an optical element, which is preferably a light collection shroud 207 (as shown in FIGS. 5a and 5b). The light collection element 207 constantly applies a 4:3 rectangle of light to the input of a stationary integrator rod 212 (see FIG. 7). As the motor 204 rotates, and LEDs in ring 202 are illuminated at the input side of the rod 212, a rectangle of light is transmitted outward from above the motor shaft axis 208. The rectangle, regardless of where it is lit on the RA, always maintains the same orientation. Thus the output of the shroud is a rectangle that does not rotate.

FIG. 5a provides a view similar to that of FIG. 4 with an additional emphasis on the shroud. FIG. 5b shows a top view of the shroud 207. As shown in these figures, a beam collection shroud 207 is mounted on a shaft connector collar 209. The shroud 207 is preferably made of a plastic material and includes a top light opening 211. The shaft connector collar 209 is preferably made from a metal.

As shown in FIGS. 5a and 5b, the shroud 207 can be used to completely enclose the lens 216 and mirrors 215 and 217. This would typically be a plastic shroud of two pieces, a top and bottom that are mechanically connected together. The input and output light passes through openings at the top and bottom surface of the shrouds. This surface of the shroud 207 could use flat glass or flat clear plastic window. The number of lenses needed within the shroud can vary by embodiment. An advantage of using a shroud is that it has no rough or irregular surfaces that strike the air as it rotates. This should reduce audible noise as the shroud rotates. The shroud will also reduce the load on the motor that would have resulted from the drag caused by the mirrors and other parts catching air if the shroud was not used.

The number and types of optical elements used within the shroud 207 can vary considerably. In the simplest form, only a single lens (216) is used at the bottom input surface to the shroud 207. Then the light is steered by two low-cost flat mirrors (215, 217) to the shroud output. The lens could do a simple 1:1 image where the image of the lit rectangle of LEDs is the same size as the integrator rod input.

In another embodiment, a lens (not shown) could also be added at the output of the shroud 207. Alternately, the two mirrors could be curved to give them some optical power. Another lens, besides having one at the input and output of the shroud, could also be used, for example, between the two mirrors. If curved mirrors are used, an option is also to have no lens at all—instead the curved mirrors give all the needed optical light corrections. It is possible to only have two flat mirrors with no elements within the shroud that have optical power. In this case, any needed lens could be stationary elements at the output of the shroud just prior to the stationary integrator rod.

The remainder of the optical system will now be described with reference to FIG. 7, along with FIGS. 4, 5a, 5b and 6. Light from the LED array 200 is transmitted to the relay lens 216, which is located above a portion of the LEDs 202. A beam collection mirror 215 receives the light from lens 216 and reflects that light to beam steering mirror 217. Light reflected from beam steering mirror 217 impinges an input of integrator rod 212. The beam steering mirror 217 is preferably circular.

The integrator rod 212 integrates the light into a near uniform brightness over of its output area. Light from integrator rod 212 is directed to an optics section that includes lens 219, mirror 221, and lens 223. An illumination relay lens group, typically 2 or 3 lenses, images the image of the rectangular output of the integrator rod onto the DMD 214. For each pixel, the DMD 214 either reflects light into the projection lens 222 or into a dump light location outside of the projection lens path. The projection lens 222 images the DMD image onto a display screen 205. The projection lens 222 typically includes a user-adjustable focus mechanism, where one or more projection lens elements can be moved, so that the displayed screen image can be focused to single DMD pixel resolution.

While shown as a DMD 214, it is understood that other spatial light modulators can be used. For example, the spatial light modulator 214 can be a liquid crystal display (LCD) or a plasma display.

FIG. 7 also shows control electronics in blocks 226 and 228 that can be used to control the DMD 214. For example, the pixel data is provided to the DMD by circuits in block 226. This block 226 receives RGB image data from a video source (not shown) such as a computer or a set top box. The RGB data is then processed and provided to the DMD 214.

Block 226 also controls the sequence that mirrors within the DMD 214 should be set and reset. In one embodiment, this sequence is varied according to light intensity data received from light sensor (not shown). Mirror reset commands can be sent from block 226 to block 228. Block 228 houses the DMD mirror waveform driver electronics and sends mirror reset line control information to the DMD 214.

Control electronics 224 is shown as a means to control the LED addressing and driver and to control the motor. The block 224 can be implemented on an integrated circuit, e.g., an application specific integrated circuit, or in other circuitry. The circuitry in block 224 could also be combined with other circuits used in the control of the system. DC power supply 225 supplies the power to the LED array.

The operation of the system 210 will now be discussed in further detail. As the motor 204 and shroud 207 rotate, only the LEDs directly under the input end of the shroud 207 are illuminated. Thus as the assembly 207 rotates, a rectangular area of the LED ring 202 is seen also to rotate around the ring array. Each LED is electronically addressable. In the preferred embodiment, a rectangle of 38.7 LEDs (time averaged) on the LED Ring Array 202 is illuminated at all times. Since 300 total LEDs are in the ring, a low duty cycle is achieved for each individual LED.

Figure 15:
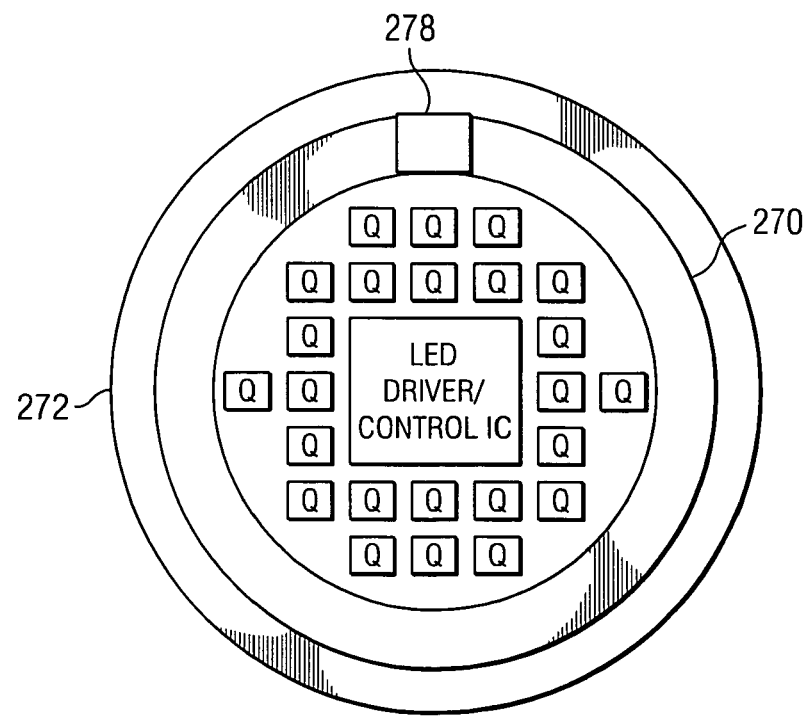

In an alternate embodiment, the shroud assembly 207 remains stationary, while the LED ring 202 rotates. Yet further, both elements 202 and 207 could rotate. In each of these examples, the optics 207 and the LEDs 202 are moving relative to one another. This alternate embodiment is shown in FIG. 15.

Since only 38.7 of the 300 LEDs are on at once, the average duty cycle for each LED is (38.7/300)×100=12.9%. However, LEDs at the center of the rotating circle of active LEDs have a longer duty cycle than the LEDs closer to the edges of the Ring Array 202. Moving along the radius of the array 202, the duty cycles will range from about 16% for LEDs along the center of the Ring Array to about 9% for LEDs near the outer and inner edges of the Ring Array 202.

In practice, having LEDs with varying duty cycles means that LEDs in the center of the ring will be pulsed with lower current and the LEDs near the edges of the Ring Array can be pulsed with higher current. This can be supported since each LED is addressable and can have independent power control. Since the rectangular rod 212 provides optical integration, there is no degradation to screen brightness uniformity due to using different current pulse amplitudes for different LEDs.

Each LED is pulsed to give about the same average power, e.g., about 0.16 W (a pulsed power of 1.3 W). The power 1.3 W was selected because when this power is used for the green LEDs at a 12.9% duty cycle, the green LEDs have the same lifetime as the green LEDs used in the FA example above (0.56 W pulse power with a 60% duty cycle). In a preferred embodiment, the power selected will be determined by whatever achieves the 20,000 hour LED lifetime as discussed earlier for the FA.

Since each LED in the ring 202 has a low duty cycle, the current applied to each LED can be much higher during the on time. This is allowed because the low duty cycle keeps the average power low and lifetime long even though the power during the on time is high. Since the average power is low, the junction temperature of each LED is kept well below the maximum allowed temperature per the manufacturer's data sheet. Also, since the current is applied with a low duty cycle, other factors that impact LED lifetime such as current density have less impact on lifetime.

In general, the more LEDs that are used in the scan-ring the longer the LED lifetimes. Thus the number of LEDs used can be adjusted to support the product lifetime needed. Also, the pulse duration is very short for each LED. A 12.9% duty cycle over one 120 Hz rod rotation, gives a pulse during $(1/120) \times 0.129 = 1.1$ ms. A typical thermal time constant of an LED is about 1.0 ms. So the pulse duration is short enough not to drive the junction temperature over the allowed manufacturer's rating during the pulse time interval. And since each 1.1 ms pulse is followed by a long off time of about 7.2 ms, the junction has a time to cool down before the next pulse is applied.

It is noted that some LED manufacturer's data sheets do not specify high pulsing as being allowed. These LED data sheet specifications, however, are typically established to allow LEDs to last for over 100 k hours before failure. For a projector, such as a conference room business projector or home projector, an illumination source lifetime of only about 20,000 hours is needed to last the normal lifetime of the projector. Testing of LEDs shows that they can be pulsed much higher than the manufacturer's data sheet specifies without burning out. Also, some manufacturers give curves to show how lifetime degrades with current and duty cycle levels.

When compared to the FA it can be seen that the pulsed power is higher for all LEDs. Since the pulsed power is what is used when the LEDs are on, therefore the RA gives more lumens into the integrator rod at any point in time. In the examples in the tables, the RA gives 1.7× more lumens with the same LED lifetime as will explained below.

Pulsing of an LED reduces its efficiency (lumens/Watt output). For example, using a 60% duty cycle and 0.56 W pulsed power for all green LEDs in the green array in the fixed array method may reduce the efficiency by 0.43 as shown in Table 3. Using the 12.9% duty cycle in the Ring Array, with higher peak current, may reduce the efficiency by a factor of 0.30 as shown in Table 5. (In Table 5, 1.3 W pulsed power is used for LEDs in the Scan Ring.) While this is an inherent loss when using either the Fixed Array concept or the Ring Array concept, this loss is more pronounced with Ring Array concept. However, although this loss is significant, the overall screen lumens boost, when comparing the ring array concept to the Fixed Array concept, shows that the Ring Array benefits are still very significant.

TABLE 5

| | |
|---|---|
| .30 | Efficiency loss due to high pulse current (compared to DC current) for G and B |
| .60 | Efficiency loss due to high pulse current (compared to DC current) for R |
| .80 | LED light outside of used light cone (collect only +/− 45° of total LED light) .80 × .30 = .24 net LED Losses for G and B .80 × .60 = .48 net LED Losses for R |

Tables 6 and 7 show the screen lumens performance for a Ring Array projector using the same LED types but with many more of them and using them in the array concept. It can be seen that the screen lumens boost is 1.4× (341 lumens vs. 243 lumens). As brighter LEDs are developed in the LED industry, this lumens boost will not reduce. Any efficiency gains by LED manufacturers helps both the Fixed Array and Ring Array systems but the net lumens boost factor for the RA over the FA system is still achieved.

TABLE 6

| Single LED output (DC, unpulsed) | 1.3 W during pulse, .16 W average | LED losses | System optics losses | Lumens when pulsed | |
|---|---|---|---|---|---|
| 45 L/W | × (0.28 A × 4.680 V) × | .48 × | .42 = | 11.9 | Red |
| 90 L/W | × (0.16 A × 8.05 V) × | .24 × | .49 = | 13.8 | Green |
| 21 L/W | × (0.16 A × 8.05 V) × | .24 × | .42 = | 2.8 | Blue |

| % on-time for LEDs | | Lumens when pulsed | | | |
|---|---|---|---|---|---|
| .13 | × | 11.9 L | = | 1.67 R Lumens average for one R LED | |
| .60 | × | 13.8 L | = | 8.28 G Lumens average for one G LED | |
| .26 | × | 2.8 L | = | 0.728 B Lumens average for one B LED | |

TABLE 7

| | |
|---|---|
| R LEDs pulsed on at once × Avg. Lumens of a Single R LED | (38.7 LEDs × 1.67 L) |
| G LEDs pulsed on at once × Avg. Lumens of a Single G LED | (38.7 LEDs × 8.28 L) |
| B LEDs pulsed on at once × Avg. Lumens of a Single B LED | (38.7 LEDs × 0.728 L) |
| Total Screen Lumens | 413 |

In a Ring Array system, spokes exist in the Ring Array at the input to the rotating rod 212. The rod 212 sees each spoke as a mixture of two primary colors. This system can utilize Spoke-Light-Recapture in a manner similar to what is used with color wheel based systems that use arc lamps. One such system is described in U.S. Pat. No. 6,324,006, which is incorporated herein by reference. Thus for an all white screen, with the ring array embodiment, the area of LEDs directly under the rotating rod are lit 100% of the time as the rod makes a complete revolution around the LED Ring Array.

The Ring Array system also allows the use of a white segment by placing a section of white LEDs (not shown) in the Ring Array 202. For this to be beneficial to screen lumens, however, the efficiency of each individual white LED should be greater than the red, green and blue LED efficiencies. Otherwise, it is simpler to just use red, green and blue LEDs in the array since little or no screen lumens boost is achieved from the white LEDs. If white LEDs are used in the Ring Array, this white light can be used in the same way that it is used in projectors today, which are based on color wheels and arc lamps. In these systems a clear section is placed in the color wheel to form the white segment.

In addition to allowing much higher pulsed currents, a Ring Array system might have at least three other advantages that contribute to the superior lumens performance compared with a Fixed Array system. These advantages will be described now.

To boost green lumens relative to red and blue lumens, the Ring Array can increase the green ring segment size without increasing power to each green LED. The green LED duty cycle remains the same as it is for red and blue LEDs regardless of the percentage of green LEDs in the ring. With the Fixed Array, if more green light is needed relative to red and blue light, the green LED duty cycle must be increased. The result is that the green LEDs must run at much higher average power in a Fixed Array system while the red and blue LEDs run at lower average powers. This reduces the green LED lifetime or, if the green LED average power must be reduced to preserve lifetime, then green screen lumens are reduced. Since green screen lumens are reduced, red and blue LEDs must be turned down to maintain an acceptable white color coordinate. Thus, an overall lumens reduction occurs for all colors.

Boosting green lumens more at the expense of red and blue is important for color balance because green is the LED technology obstacle. The Ring Array concept achieves this while keeping the average power constant to all LEDs in the Ring Array. By maximizing the peak power possible to all LEDs, and equalizing the average power to all LEDs, illumination light to the DMD is maximized.

Unlike the Fixed Array system, the Ring Array system has no color filters that reject the LED light spectrum tails that overlap as described earlier with respect to FIG. 3. Since there are no color filters needed with the RA, none of the light from the LEDs is rejected because of its spectral content. This eliminates the light transmission loss of each color filter and also saves cost in the projector. For simplicity of analysis, the Ring Array lumens boost due to not having the transmission losses from the color filters not accounted for in the analysis in the tables.

In this example the optics 207 rotate at 120 Hz. Using this rate ensures that any light variation in time for LEDs during a rotation of the wheel will not be perceptible to humans as flicker. All flicker components will be above the 65-85 Hz flicker threshold (depending on screen lumens and room background light) of humans.

The Ring Array concept can have illumination light intensity variations during a rotation of the optical collection mechanism. As the optics rotate, the amount of light collected can vary for each angular position (out of 360 degrees) of the rod. These light variations can be caused by a number of factors.

- The number of LEDs under the optics is not exactly constant over time. The average under the optics may be 38.7 LEDs but this may vary, for example, by a few percent due to the mechanical tolerancing of the LED array with respect to the input of the rotating rod. If the number of LEDs having their light collected by the rotating optics varies, then the light on the screen will vary.
- Individual LED output can vary due to variations in the LEDs during LED manufacturing. This can cause light on the screen to vary since the rotating optics input light will vary at different angular positions of the rotating rod.
- Some LEDs can burn out which will cause light on the screen to vary since the rotating optics input light will vary at different angular positions.

As noted earlier, if the rotating optics 207 is spun at 120 Hz, no flicker will occur due to these light variations. However, since DMD bits are applied during specific intervals during a frame, any light fluctuations during a particular bit's on time can cause a bit weight error. These bit weight errors, when using the Ring Array concept, can be fixed in at least two ways.

Figure 8:
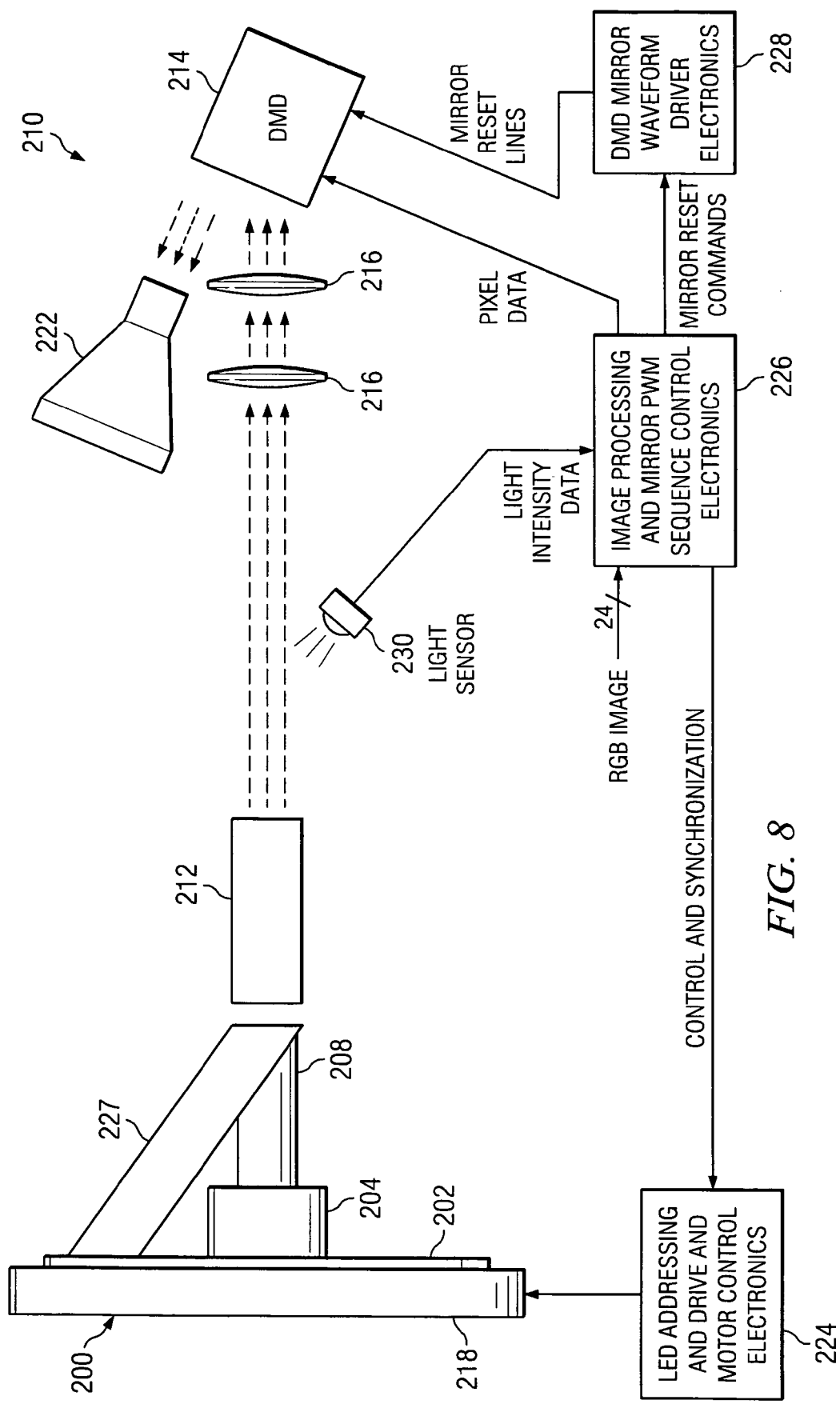
FIG. 8 shows an alternate embodiment system.

A first technique can be referred to as a clock dropping method. In this method, a sensor 230 is placed in the light path between the integrator rod 212 and the relay lens group 216 (not shown in FIG. 6; a light sensor 230 is shown in the embodiment of FIG. 8). This sensor 230 senses any errors in light intensity from the LED array illumination. As described in co-pending patent application Ser. No. 10/458,045 filed Jun. 10, 2003 and incorporated herein by reference, clock dropping can be used to do real-time bit weight error corrections throughout a frame. If the LED illumination light during a color drops, then the current bit on the DMD has its on time increased. Likewise if the illumination light increases then the current bit on the DMD has its on time decreased.

Another technique to compensate for light fluctuations can be referred to as a light regulation method. Real-time power adjustment of the power to the active LEDs can be done to maintain constant lumens applied to the DMD. Each addressable LED can have its current adjusted so that the collectively active 38.7 LED group provides constant light to the DMD 214.

An alternative way to regulate the light intensity of the active LED group is to slightly alter a high frequency duty cycle of selected members in the group. For example, if the collected lumens coming out of the rectangular integrator rod 212 goes up by 5%, then the number of effective active LEDs could be reduced to 38.7×0.95=36.8 LEDs until the light returns to the normal level. A 95% duty cycle means that the LEDs are on with a high frequency waveform (2 MHz for example) throughout the on time of the bits that need to be corrected of that color. The advantage to this approach is that the individual LEDs do not need current control to regulate power. In practice it may be simpler to simply alter the duty cycle of some LEDs since this is just a digital timing concern.

While shown in a preferred embodiment, the present invention encompasses a large number of variations. For example, LEDs can be electronically addressed in clusters rather than individually to simplify the electronics. This modification could be implemented by modifying (e.g., simplifying) of the control electronics block 224 of FIG. 7.

FIG. 8 shows an alternative embodiment that includes a rotating integrator rod 227 mounted to the rotating LED array. The rectangular integrator rod 212 collects the light from the rotating rod 227. The circle of light from the rotating rod 227 is input to the rectangular rod 212. The light is then integrated into a rectangular area, preferably with an aspect ratio (e.g., 4:3) that matches the spatial light modulator 214. The output of the rectangular rod 212 is sent to an illumination relay lens group 216. The input to the rectangular rod 212 has ±45 deg light ray angles of usable light and so does the output. The illumination relay lens 216 should therefore decrease the distribution of light angles to achieve the ±12.5 degrees for a DMD 214 that is running at f/2.4. Thus both rods 227 and 212 are running at the same f/number.

Figure 9:
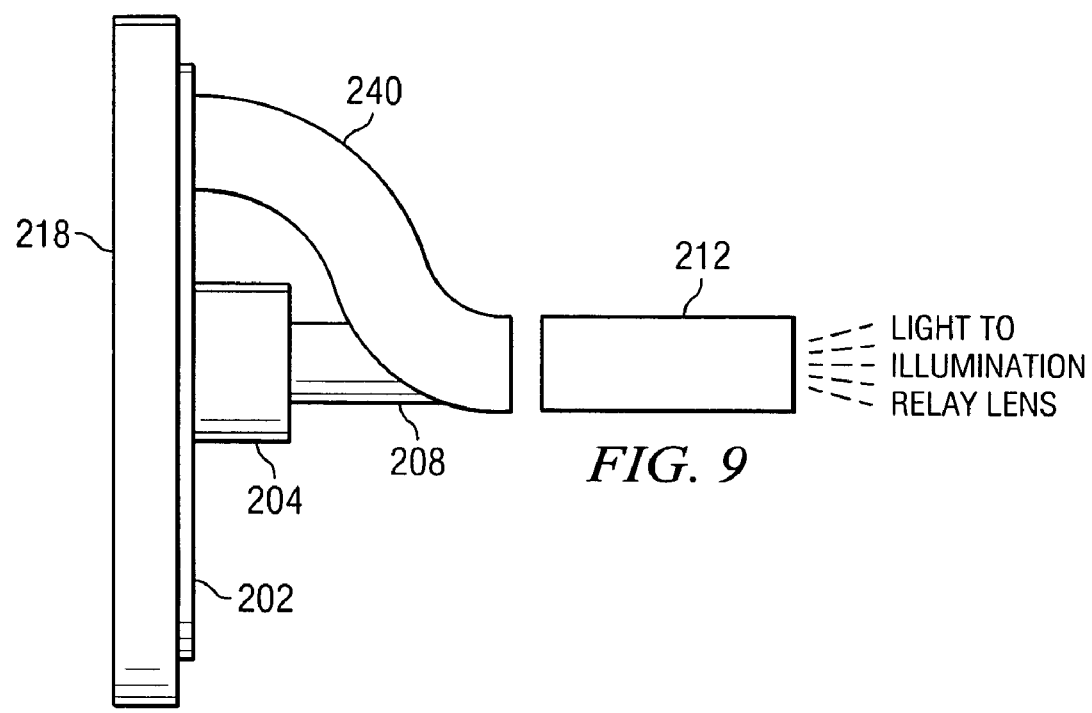
FIGS. 9 and 10 provide a second embodiment LED ring array apparatus.
Figure 10:
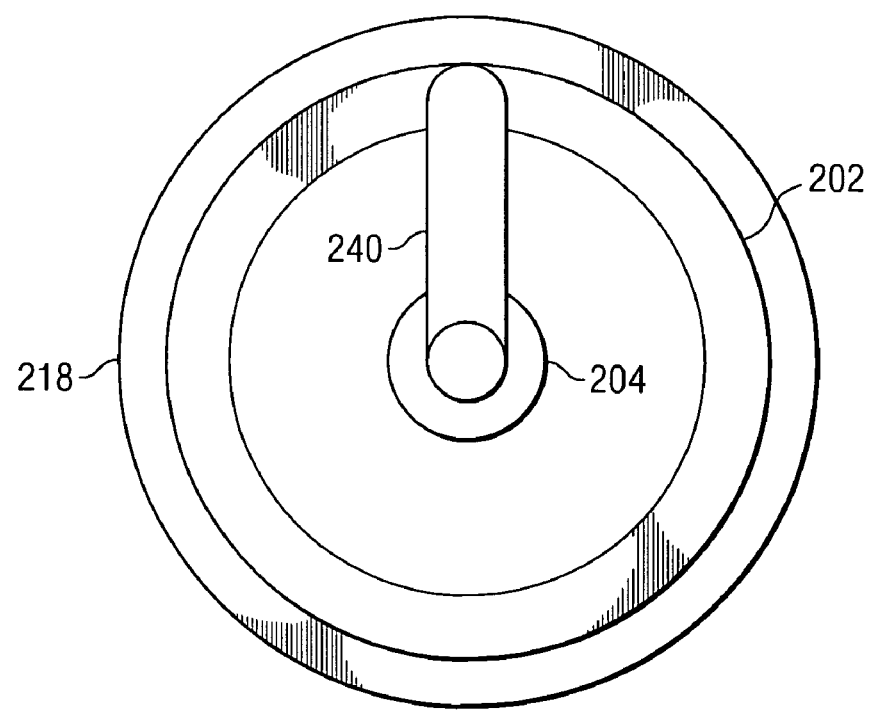
Figure 11:
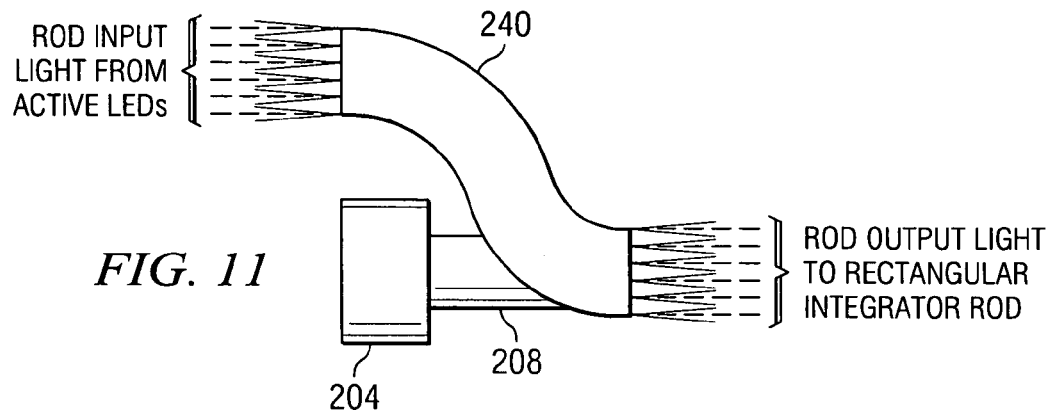
FIG. 11 shows an integrator rod of the present invention.

In other embodiments of this invention, the rotating light collection optics could use a round curved rod or fiber optic with a round LED light input as shown in FIGS. 9, 10, and 11. As described above, an appropriate optical mechanism such as a rectangular integrator rod, is used at the output of the round rotating rod 227 to convert this into the rectangular area needed at the output of the rectangular rod 212.

Referring first to FIGS. 9 and 10, a slightly S-shaped integrator rod 240 is used in place of the integrator rod 227 of FIG. 8. The S-shaped integrator rod 240 avoids the oval shape of a tilted rod and provides a circular input and output. As with the oval-shaped rod 227 of FIG. 8, rod 240 could be either solid or hollow. Solid rods could be from glass, plastic, or fiber optic materials. Any solid rod should preferably keep the bend radius low enough so the TIR (total internal reflection) does not break down.

Figure 12:
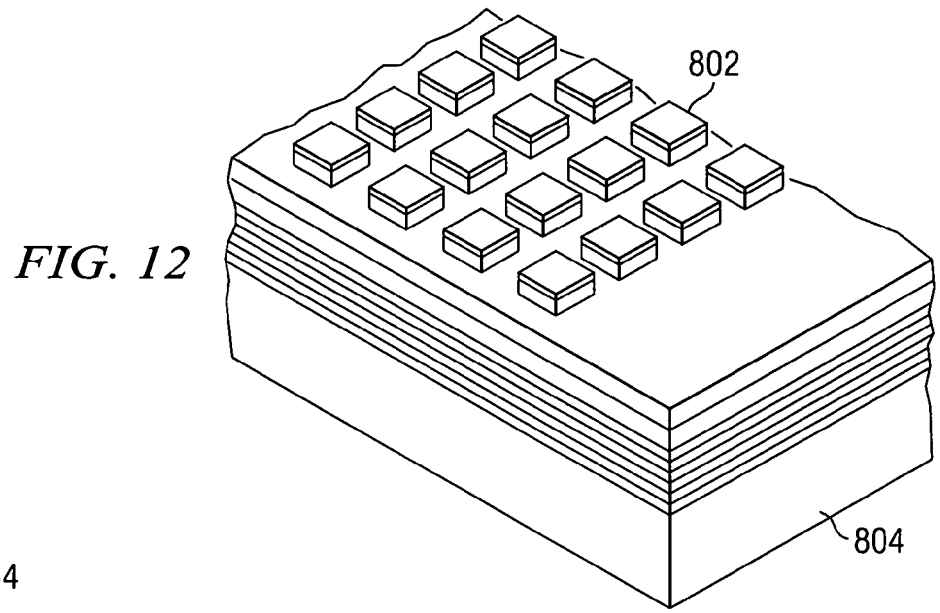
FIG. 12 shows alternate embodiment ring arrays.

Integrating multiple LED die 802 onto a single integrated circuit is also an option shown in FIG. 12. This allows the LED interconnect to be done on the semiconductor wafer 804 and reduces cost. Encapsulation and a microlens array (not shown in FIG. 12; see element 206 in FIG. 4) would then be used to achieve optimal light collection. This method provides for many more LEDs to fit within the DMD etendu since the LEDs on the integrated IC can be packed much more closely together (higher LED fill factor) than having separate bare LED dies on a ceramic PCB. To form the Ring Array, several of these integrated LED array ICs would be needed unless different wavelength LEDs could be formed on the same semiconductor substrate.

Figure 13:
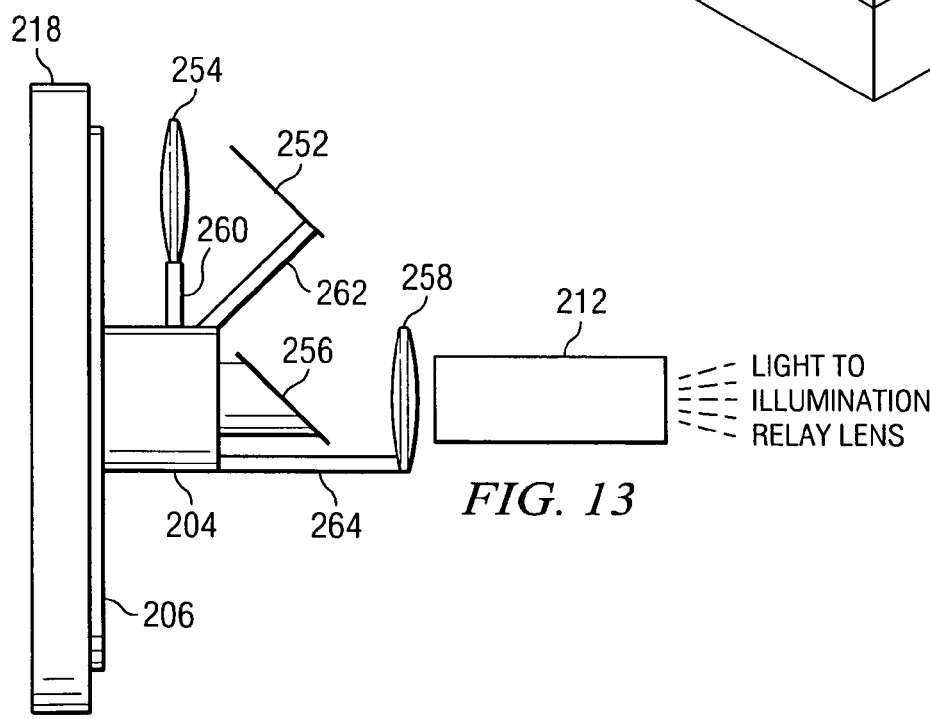
FIG. 13 provides a third embodiment LED ring array apparatus.

FIG. 13 shows a slight variation of the embodiment of FIG. 7. The embodiment of FIG. 13 uses two rotating fold mirrors 252 and 256 and also two rotating relay lenses 254 and 258. The components are connected by mechanisms 260, 262 and 264 as shown in FIG. 13. Unlike the optical collection mechanisms that use a circular input, a rectangle of light can be lit on the LED array rather than a circle of light. The advantage of this is that the rectangle of light can be imaged directly into the input of the stationary rectangular integrator rod. There is no light loss due to the circle having a smaller area than the rod input rectangle. The output of the beam steering from the beam steering mirror output is a non-rotating rectangle of light. As described earlier regarding FIG. 7, this is accomplished by keeping the lit rectangle of LEDs from rotating about the center of the rectangles axis. While the rectangle in its entirety moves around the ring of LEDs, the sides of the rectangle are always parallel to the rectangle at other positions in the ring.

Figure 14:
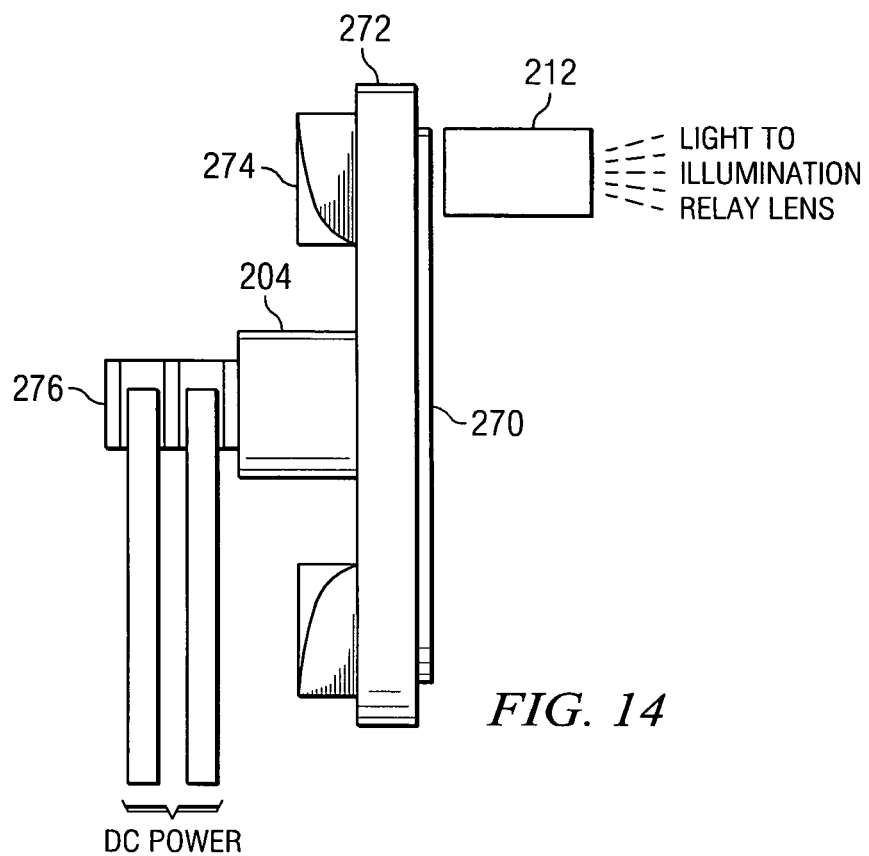
FIGS. 14 and 15 show a fourth embodiment LED ring array apparatus.

FIGS. 14 and 15 show another embodiment of the present invention. In this embodiment, the LED ring 202 can be on a rotating wheel so that all optics are stationary. With the Ring Array apparatus shown in FIG. 8, there is a loss of potential lumens due to the fact that the LED area illuminated should be a circle. Since the DMD is rectangular, a larger area of LEDs could be turned on and still be within the etendu of the DMD. Some solutions above provided for a rectangular lit area of LEDs. The solution in FIGS. 14 and 15 also provide for this.

The LED Ring Array wheel in FIGS. 14 and 15 easily overcomes the problem of needing a rectangular area lit on the LED array. This method eliminates the rotating optical collection element like the oval-shaped rod 227. With this method, the light into the stationary rod 212 can be rectangular. This is because the LEDs in ring 270 are individually addressable and a rectangle 278 can be formed within the LED ring 270 as shown in FIG. 13. As the LED wheel 272 rotates, a rectangle 278 of light is always going into the stationary rectangular integrator rod 212 and all of the other LEDs are off. It should be noted that if the LEDs are illuminated in a rectangular pattern on the ring then more LEDs are needed in the Ring Array than those needed in the FIG. 7 ring. This is because the rectangle uses a larger and non-curved area on the ring.

In FIG. 14, the electronics power must be applied to the rotating LED ring to power the LEDs. This can be done by the means of contact brushes 276 such as those used in electrical motors. In this example, a DC brushless motor 204 is shown. The apparatus can be kept cool by using an aluminum wheel 272 and fan blades/heat sink fins 274. An alternative method of getting power to the rotating LED array is to use a liquid mercury based rotating switch. The rotating switch has a power and ground input from a stationary power supply; these two signals are connected to the LED array PWB by means of mercury that is in continuous contact with brush surfaces on the rotating shaft within the sealed switch. A mercury switch may provide advantages such as reduced audible noise when compared to using brushes such as those typically used in the motor.

Embodiments of this invention also include an option to not need any optical integration. For example, in FIG. 7, the rod 212 could be left out. In this configuration, the LEDs 202 move with time regarding where they are optically imaged on the spatial locations on the DMD 214. This motion with time means that if one LED is dimmer than others, the dim section of the DMD illuminated by this LED will have this section of the DMD also lit by another green LED later in time. This constant cycling of different LED images on any given section of the DMD has the effect of integrating the light for each color over the DMD. However, this technique should be used with caution because extreme conditions, such as if an LED burns completely out, may cause light uniformity artifacts on the DMD that cannot be corrected by this rotating LED light integration. This method is not as robust, in terms of engineering, when compared to using an integrator rod or other light integration optical element.

As discussed above, series of light sensors can be included around the periphery of the DMD to sense the light output achieved by each LED. The sensors can be integrated onto the DMD silicon or as a separate assembly. LEDs that are too bright can be reduced in intensity with clock dropping, PWM power reduction, or simply lowering the pulsed current level when the LED is on. All this has the net impact of keeping the screen uniform throughout a color time so that the bits applied to the DMD do not develop spatial artifacts. However, this does not correct for LED burn-outs, only for variations in LED intensity.

Each of the preceding embodiments of the invention was directed to an array of LEDs with red, green, and blue (or their complementary colors) sections of LEDs in it. However, there are other variations of this invention that do not include all three colors of LEDs in the scan-ring. For example, three rings or two rings (one with two colors and the other with a single color) can be included. In other embodiments (where more than three colors are desired), more than three rings could be included. The following paragraphs describe but a few examples.

In a first example, the system would include three scan rings. In a particular embodiment, these rings would be red, green, and blue. FIG. 3 illustrates one such system where the scan rings (e.g., see element 200 in FIGS. 5 and 6) are inserted in place of the fixed arrays 102, 104 and 106 in FIG. 3. Each scan-ring can put out more light than the fixed LED array for each color since the LEDs that are on can be pulsed with higher current. Alternatively, only one or two of the fixed arrays 102, 104 and 106 can be replaced with a scan-rings. For example, there can be one fixed array and two scan rings or two fixed arrays and one scan ring. Reference can be made to the description of FIG. 3 and other portions of the application to understand this embodiment.

In another example, a scan-ring is used for green while a single scan ring is used for red and blue. This embodiment is advantageous since green LEDs tend to be the most lumens deficient. In other embodiments, other combinations of colors can be used. This example can also be understood with reference to FIG. 3, where the fixed array 104 is replaced with a scan-ring having only green LEDs and either the fixed array 102 or 106 is replaced with a scan ring having both red and blue LEDs.

Figure 16A:
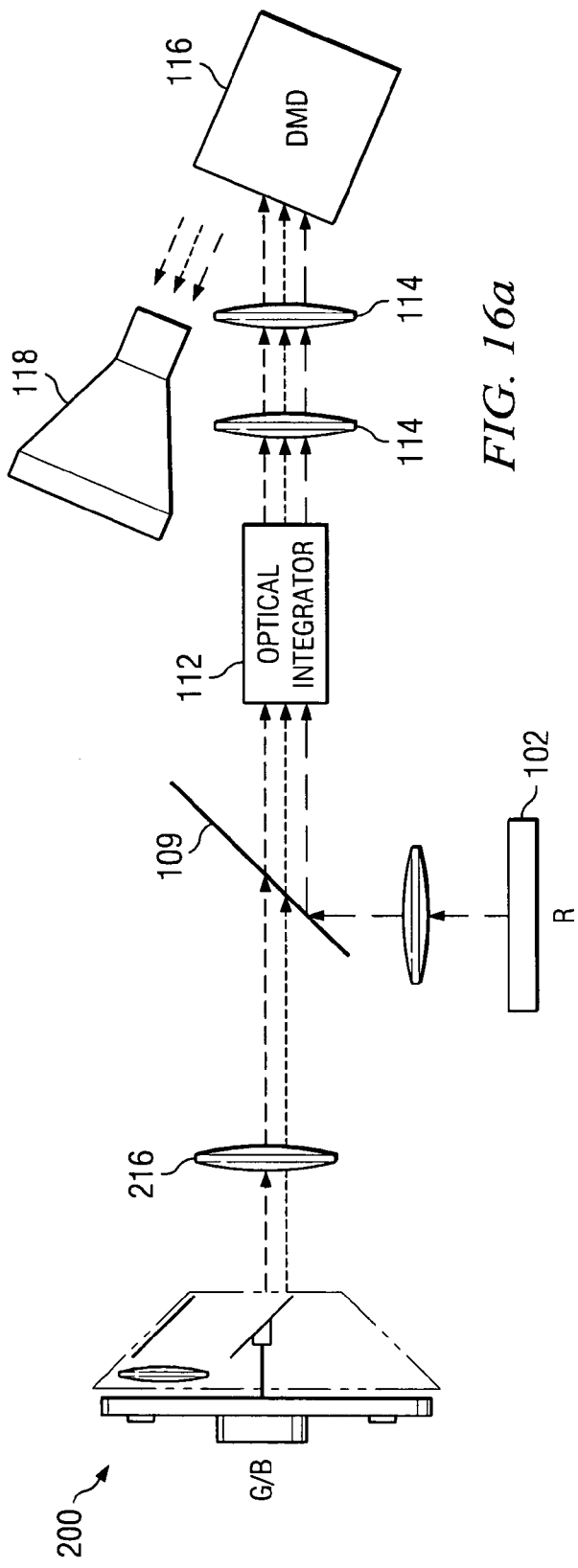
FIGS. 16a and 16b show an fifth embodiment that includes a fixed array and a LED ring apparatus.
Figure 16B:
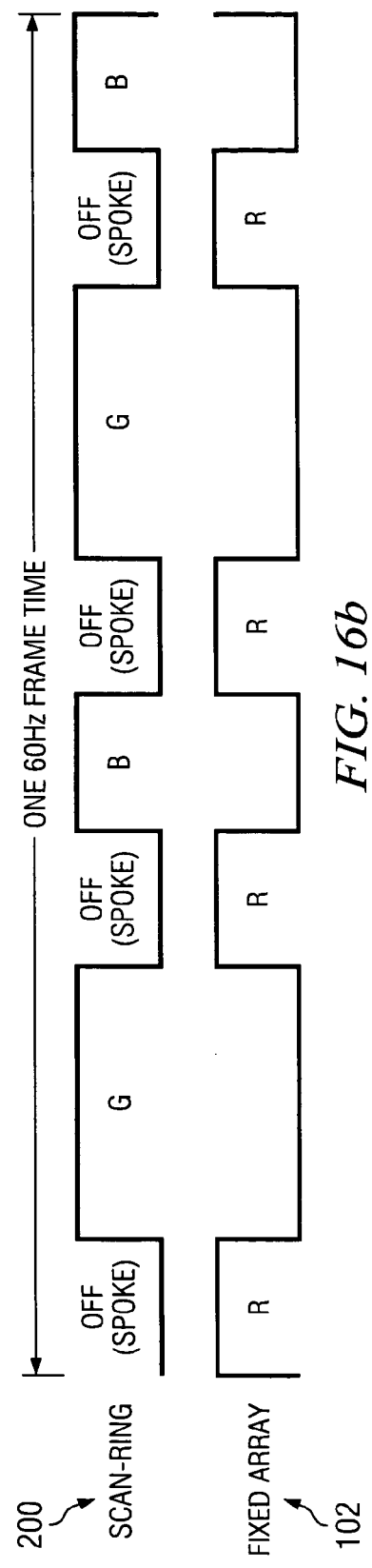

Yet another embodiment is illustrated in FIG. 16, which includes FIGS. 16a and 16b. In this example, one scan-ring 200 is a split of two colors (green and blue for example) and one fixed array transmits the remaining color (red for example). The optics is similar to that described in FIGS. 3 and 7, as examples. For instance, the filter 109 would reflect the red spectrum while transmitting the blue and green spectrums. FIG. 16b shows one example of the timing, where only one color is transmitted at a time. The scan-ring 200 is turned completely off during the time that both green and blue LEDs would have been imaged to the integrator rod if they had been turned on. This is the spoke time of the scan-ring. During this spoke time the red fixed array is turned on. Thus, as shown in FIG. 16b, the DMD always sees red, green, or blue light and no mixed color times occur as is the case with a single scan-ring like that shown in FIG. 7.

An advantage of all these options is that during the time when a mechanical spoke of the scan ring is imaged to the integrator rod, the LEDs in the scan-ring can be turned off until the spoke has passed. This means that the red, green, and blue colors can be brighter. This is because spoke light, as used in FIG. 7 with a single scan-ring, is used only to boost yellow, cyan, magenta, grays, and white lumens—but the spoke light cannot be used to boost red, green, or blue lumens. Thus the spokes in a single scan-ring system cause red, green, and blue to be dimmer relative to secondary colors, grays, and white in projectors.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments described in the specification.

What is claimed is:

1. A display system comprising:
   a plurality of LEDs;
   an optical element located to receive light from at least one of the LEDs, the optical element and the plurality of LEDs being movable relative to each other so that the optical element is adjacent to different ones of the LEDs at different times;
   an integrator rod located to receive light from the optical element;
   a relay lens located to receive light from the integrator rod;
   a spatial light modulator located to receive light from the relay lens; and
   a projection lens located to receive light from the spatial light modulator.

2. The system of claim 1 wherein the spatial light modulator comprises a digital micromirror device.

3. The system of claim 1 wherein the plurality of LEDs are mounted on a printed circuit board, the system further comprising a motor coupled to the optical element to cause the optical element to move relative to the printed circuit board.

4. The system of claim 1 and further comprising control electronics coupled to the spatial light modulator to control the state of pixel elements within the spatial light modulator.

5. The system of claim 4 and further comprising a light sensor located in a light path between the integrator rod and the projection lens, the light sensor including an output coupled to the control electronics.

6. The system of claim 1 wherein the optical element comprises a second integrator rod.

7. The system of claim 1 wherein the optical element comprises an optical collection shroud.

8. The system of claim 7 wherein the optical collection shroud includes a body and at least one optical element affixed to the body.

9. The system of claim 8 wherein the at least one optical element comprises a mirror.

10. The system of claim 8 wherein the at least one optical element comprises a lens.

11. The system of claim 8 wherein the at least one optical element comprises a first mirror, a second mirror and a lens.

12. A display apparatus comprising:
    a plurality of LEDs mounted along a periphery of a substrate;
    a microlens array overlying the plurality of LEDs;
    a motor located in substantial alignment with a center point of the substrate; and an optical collection shroud coupled to the motor so as to rotate relative to the plurality of LEDs.

13. The apparatus of claim 12 and further comprising a heat sink attached to the substrate.

14. The apparatus of claim 12 wherein the plurality of LEDs comprises a plurality of red LEDs, a plurality of blue LEDs and a plurality of green LEDs.

15. The apparatus of claim 14 wherein the plurality of LEDs includes at least half green LEDs.

16. The apparatus of claim 12 wherein the plurality of LEDs is mounted in a substantially oval configuration on the substrate.

17. The apparatus of claim 12 wherein the plurality of LEDs is mounted in a substantially circular configuration on the substrate.

18. The apparatus of claim 12 and further comprising an integrator rod located to receive light from the optical collection shroud.

19. The apparatus of claim 12 wherein the optical collection shroud includes a body and at least one optical element affixed to the body.

20. The apparatus of claim 19 wherein the at least one optical element comprises a mirror.

21. The apparatus of claim 19 wherein the at least one optical element comprises a lens.

22. The apparatus of claim 19 wherein the at least one optical element comprises a first mirror, a second mirror and a lens.

23. A display apparatus comprising:
    a substrate;
    a plurality of light emitting diodes (LEDs) coupled to the substrate; and
    an optical element located adjacent to at least one of the LEDs, wherein the optical element and the plurality of LEDs are movable relative to one another so that the optical element is adjacent to different ones of the LEDs at different times.

24. The apparatus of claim 23 wherein the plurality of LEDs comprises a plurality of red LEDs, a plurality of blue LEDs and a plurality of green LEDs.

25. The apparatus of claim 24 wherein the plurality of LEDs includes at least half green LEDs.

26. The apparatus of claim 23 and further comprising a motor coupled to the optical element so that the optical element rotates relative to the plurality of LEDs.

27. The apparatus of claim 23 wherein the plurality of LEDs comprises a plurality of LED dies mounted on the substrate.

28. The apparatus of claim 27 wherein the plurality of LEDs is mounted in a substantially circular configuration on the substrate.

29. The apparatus of claim 23 wherein the substrate comprises a printed circuit board such that the plurality of LEDs comprises a plurality of packaged LEDs mounted on the printed circuit board.

30. The apparatus of claim 23 wherein the substrate comprises a LED interconnect layer overlying a heat sink.

31. The apparatus of claim 23 wherein the substrate comprises a semiconductor substrate.

32. The apparatus of claim 23 wherein the LEDs comprise a plurality of bare LED dies, the apparatus farther comprising a microlens array overlying the plurality of bare LED dies.

33. The apparatus of claim 23 wherein the optical element comprises a shroud.

34. The apparatus of claim 23 wherein the optical element comprises an integrator rod.

35. The apparatus of claim 23 wherein the optical element comprises a first lens, the apparatus further comprising a first mirror, a second mirror and a second lens, wherein light from an LED adjacent the optical element is directed through the first lens toward and reflected from the first mirror and the second mirror and then through the second lens.

36. The apparatus of claim 23 wherein the plurality of LEDs are connected to a rotatable substrate that is operable to rotate relative to the optical element.

37. The apparatus of claim 36 and further comprising a motor coupled to the substrate, the motor receiving power through a plurality of brush contacts.

38. A method of displaying video signals using a plurality of LEDs and an optical element, the method comprising:
sequentially turning on ones of the plurality of LEDs;
directing light from turned-on LEDs to the optical element by moving at least one of the plurality of LEDs or the optical element so that the optical element is adjacent the turned on ones of the LEDs;
directing the light from the optical element toward a spatial light modulator; and
directing a modulated version of the light from the spatial light modulator.

39. The method of claim 38 wherein the ones of the plurality of LEDs are sequentially turned on in a manner such that each of the LEDs is turned on once during a cycle time and no LED is turned on for longer than about 15% of the cycle time.

40. The method of claim 39 wherein each cycle time has a duration of $1/120$ seconds.

41. The method of claim 38 wherein directing light from turned-on LEDs to an optical element includes moving the optical element without moving the plurality of LEDs.

42. The method of claim 38 wherein directing light from turned-on LEDs to an optical element includes moving the plurality of LEDs without moving the optical element.

43. The method of claim 38 wherein the plurality of LEDs comprises a plurality of red LEDs, a plurality of blue LEDs and a plurality of green LEDs.

44. The method of claim 38 wherein the optical element comprises an optical collection shroud.

45. The method of claim 38 and further comprising:
measuring an intensity of light being transmitted from the turned-on LEDs; and
controlling the spatial light modulator based on the measured intensity.

46. The method of claim 45 wherein controlling the spatial light modulator comprises adjusting a clock signal provided to the spatial light modulator.

47. The method of claim 38 and further comprising:
measuring an intensity of light being transmitted from the turned-on LEDs; and
controlling a power level provided to the plurality of LEDs based on the measured intensity.

48. The method of claim 38 and further comprising:
measuring an intensity of light being transmitted from the turned-on LEDs; and
altering a duty cycle of selected ones of the LEDs based on the measured intensity.

49. The method of claim 38 wherein the spatial light modulator comprises a digital micromirror device.

50. The method of claim 38 wherein the optical element comprises an integrator rod.

51. A display system comprising:
a first plurality of LEDs arranged in a ring;
an optical element located to receive light from at least one of the LEDs, the optical element and the first plurality of LEDs being movable relative to each other so that the optical element is adjacent to different ones of the LEDs at different times;
a second plurality of LEDs;
an optical integrator located to receive light from the optical element and the second plurality of LEDs;
a relay lens located to receive light from the optical integrator; and
a spatial light modulator located to receive light from the relay lens.

52. The system of claim 51 wherein the second plurality of LEDs are arranged in a ring, the system further comprising a second optical element located to receive light from at least one of the LEDs of the second plurality, the second optical element and the second plurality of LEDs being movable relative to each other so that the second optical element is adjacent to different ones of the LEDs at different times.

53. The system of claim 52 wherein the first plurality of LEDs includes LEDs of a first color and LEDs of a second color and the second plurality of LEDs includes LEDs of a third color.

54. The system of claim 52 and further comprising:
a third plurality of LEDs arranged in a ring; and
a third optical element located to receive light from at least one of the LEDs of the third plurality, the third optical element and the third plurality of LEDs being movable relative to each other so that the third optical element is adjacent to different ones of the LEDs at different times, wherein the optical integrator is located to receive light from the third optical element.

55. The system of claim 53 wherein the first plurality of LEDs includes LEDs of a first color, the second plurality of LEDs includes LEDs of a second color, and the third plurality of LEDs includes LEDs of a third color.

56. The system of claim 51 wherein the second plurality of LEDs are arranged in a fixed array.

57. The system of claim 56 wherein the first plurality of LEDs includes LEDs of a first color and LEDs of a second color and the second plurality of LEDs includes LEDs of a third color.

58. The system of claim 56 and further comprising a third plurality of LEDs, the optical integrator located to receive light from the third plurality of LEDs.

59. The system of claim 58 wherein the third plurality of LEDs are arranged in a ring array.

60. The system of claim 51 and further comprising a projection lens located to receive light from the spatial light modulator.

61. The system of claim 51 wherein the spatial light modulator comprises a digital micromirror device.

62. The system of claim 51 wherein the first plurality of LEDs are mounted on a substrate, the system further comprising a motor coupled to the optical element to cause the optical element to move relative to the substrate.

63. The system of claim 51 and further comprising control electronics coupled to the spatial light modulator to control the state of pixel elements within the spatial light modulator.

64. The system of claim 63 and further comprising a light sensor located in a light path between the optical integrator and projection lens, the light sensor including an output coupled to the control electronics.

65. The system of claim 51 wherein the optical element comprises a shroud.

66. The system of claim 65 wherein the shroud includes a body and at least one optical element affixed to the body.

67. The system of claim 66 wherein the at least one optical element comprises a mirror.

68. The system of claim 66 wherein the at least one optical element comprises a lens.

69. The system of claim 66 wherein the at least one optical element comprises a first mirror, a second mirror and a lens.

* * * * *